(12) United States Patent
Chen et al.

(10) Patent No.: US 12,025,438 B2
(45) Date of Patent: Jul. 2, 2024

(54) MINIATURE 3D POSITION-TO-OPTICAL DISPLACEMENT SENSOR

(71) Applicant: The Curators of the University of Missouri, Columbia, MO (US)

(72) Inventors: Genda Chen, Rolla, MO (US); Jie Gao, Rolla, MO (US); Chuanrui Guo, Rolla, MO (US)

(73) Assignee: The Curators of the University of Missouri, Columbia, MO (US)

( * ) Notice: Subject to any disclaimer, the term of this patent is extended or adjusted under 35 U.S.C. 154(b) by 151 days.

(21) Appl. No.: 17/919,158

(22) PCT Filed: Aug. 24, 2021

(86) PCT No.: PCT/US2021/047234
§ 371 (c)(1),
(2) Date: Oct. 14, 2022

(87) PCT Pub. No.: WO2022/046687
PCT Pub. Date: Mar. 3, 2022

(65) Prior Publication Data
US 2023/0160685 A1    May 25, 2023

(51) Int. Cl.
*G01D 5/353* (2006.01)
*G01B 9/02056* (2022.01)

(52) U.S. Cl.
CPC ......... *G01B 9/02058* (2013.01); *G01D 5/353* (2013.01); *G01B 2290/25* (2013.01)

(58) Field of Classification Search
CPC ............ G01B 9/02058; G01B 2290/25; G01D 5/35312; B82Y 15/00
See application file for complete search history.

(56) References Cited

U.S. PATENT DOCUMENTS

| 5,402,236 A | 3/1995 | Brown et al. |
| 2005/0195403 A1* | 9/2005 | Xu .......................... G01D 5/268 356/480 |

(Continued)

FOREIGN PATENT DOCUMENTS

WO    2018050346 A1    3/2018

OTHER PUBLICATIONS

International Search Report for PCT/US2021/047234 mailed Dec. 28, 2021.

(Continued)

*Primary Examiner* — Jonathan M Hansen
(74) *Attorney, Agent, or Firm* — Sandberg Phoenix & von Gontard, P.C.

(57) ABSTRACT

A miniature, micrometer-accuracy, three-dimensional (3D) position-to-optical displacement sensor that has at least one extrinsic Fabry-Perot interferometer (EFPI) in Z direction and a series of plasmonic metasurface resonators with distinctive wavelength-selective characteristics in X and Y directions. The interferometer comprises at least one single mode optic fiber for light propagation, and a substrate mirror to create a light interference fringe as a function of distance between the mirror and the distal end of the optic fiber. Each plasmonic resonator is capable of modifying the substrate mirror and comprises an array of multiple unit nanostructure unit cells that are arranged in a two-dimensional (2D) square lattice or array in the X-Y plane. The nanostructure unit cells are preferably inscribed in the top layer of a three-layer thin film via the focused ion beam (FIB).

10 Claims, 7 Drawing Sheets

(56) References Cited

U.S. PATENT DOCUMENTS

| | | |
|---|---|---|
| 2015/0049487 A1 | 2/2015 | Connor |
| 2015/0077736 A1* | 3/2015 | Reinsch ............ G01N 21/55 356/32 |
| 2019/0155124 A1* | 5/2019 | Park ............ G01B 9/02028 |
| 2022/0057283 A1* | 2/2022 | Carini ............ G01M 5/0041 |

OTHER PUBLICATIONS

Zhu et.al., "An optical interferometric triaxial displacement sensor for structural health monitoring: Characterization of sliding and debonding for a delamination process." Sensors 17.11 (2017): 2696, p. 2-3 (online) <https://pdfs.semantioscholar.org/118f/95d88a0a5c33fedbc.cladal7a5d954678b82b.pdf>.

Sikdar et al., "An electro-tunable Fabry-Perot interferometer based on dual mirror-on-mirror nanoplasmonic metamaterials." Nanophotonics 8.12 (2019): 2279-2290, Fig 2; p. 2279-2280 (online) <https://www.degruyter.com/document/doi/10.1515/nanoph-2019-0317/html>.

\* cited by examiner

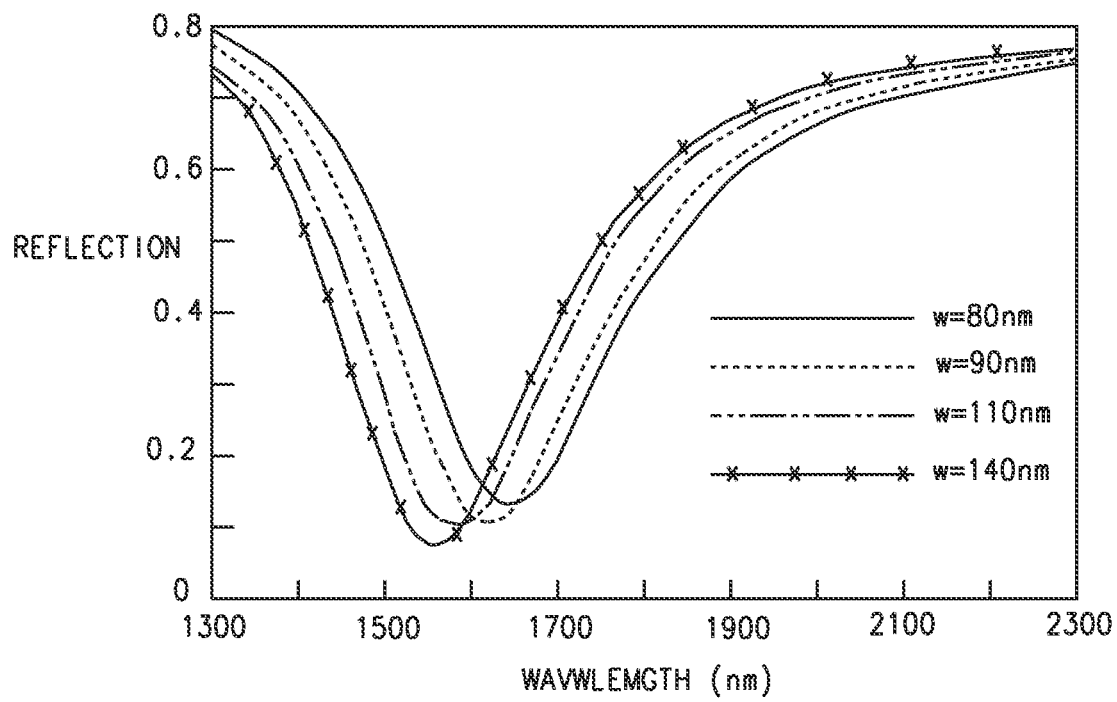
F I G. 5A
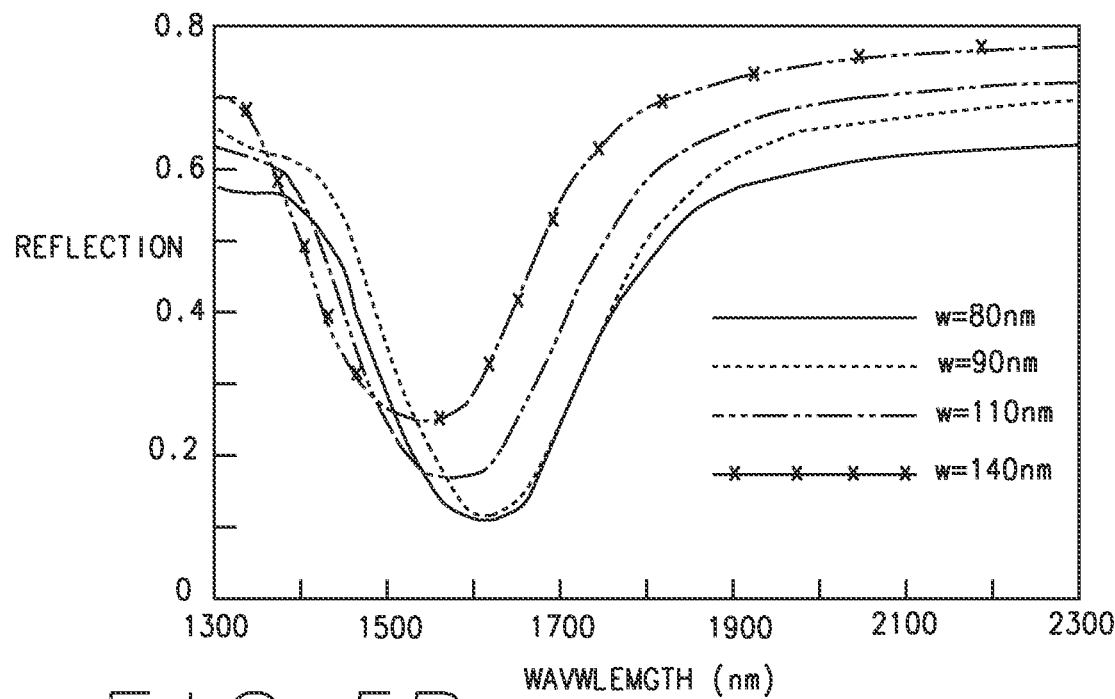
F I G. 5B

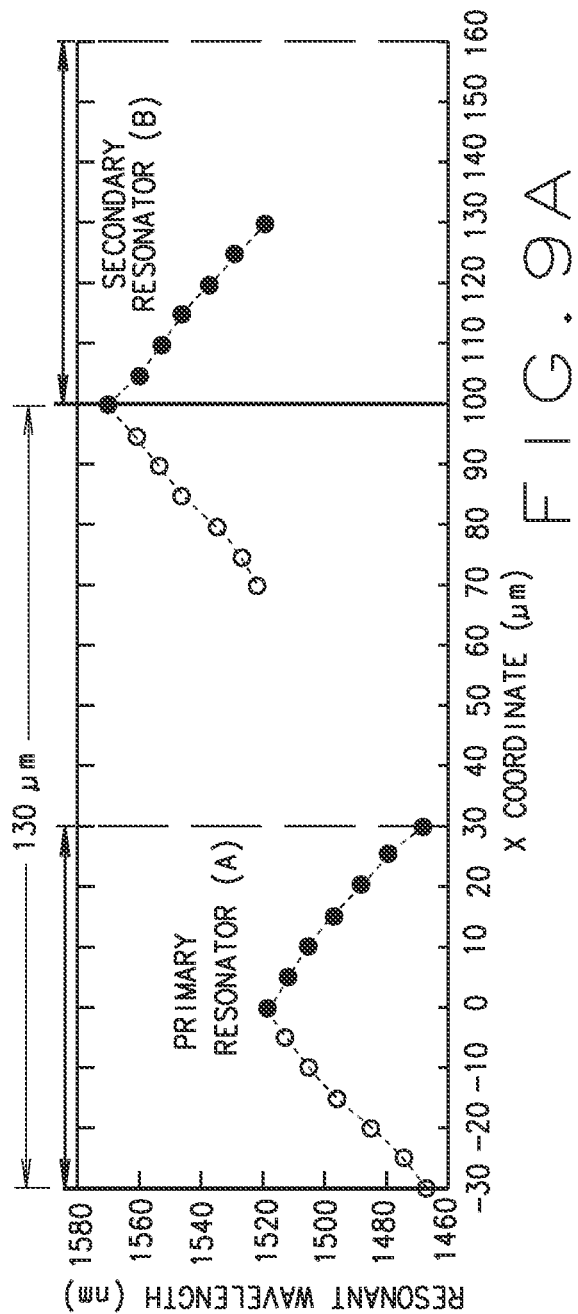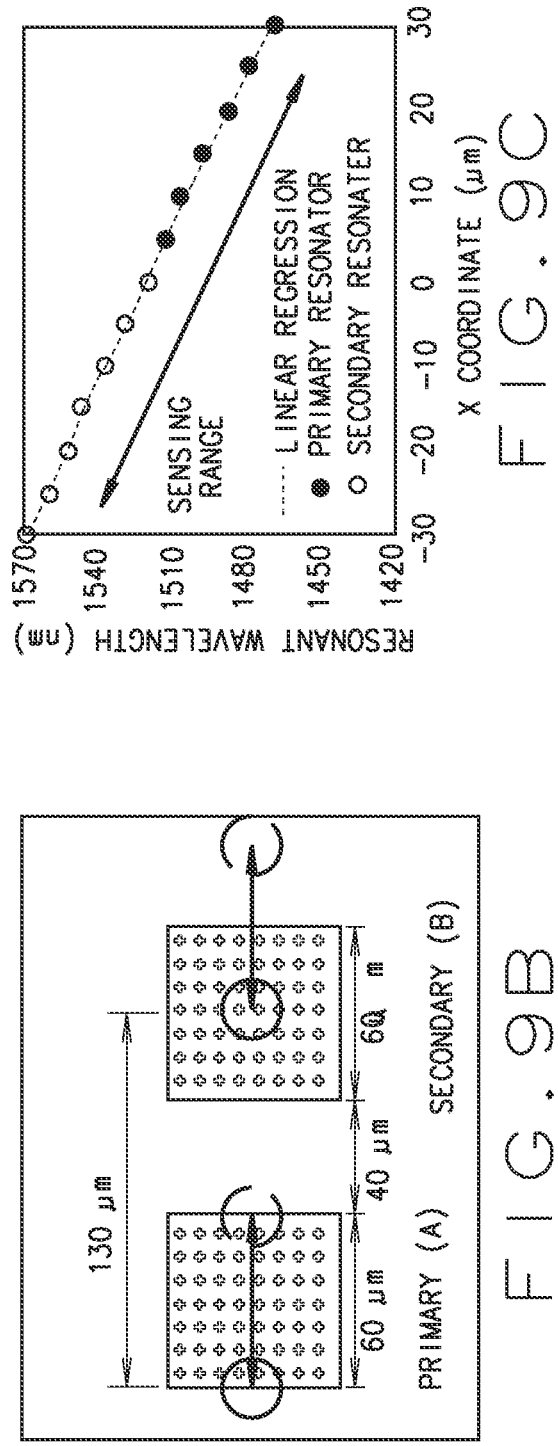

MINIATURE 3D POSITION-TO-OPTICAL DISPLACEMENT SENSOR

STATEMENT REGARDING FEDERALLY SPONSORED RESEARCH

This invention was made with government support under 69A3551747126 awarded by the USDOT/OST-R, and under CMMI-1235202 awarded by the NSF, and under ECCS-1653032 awarded by the NSF. The government has certain rights in the invention.

RELATED APPLICATIONS

The present application is the US national stage under 35 U.S.C. § 371 of International Application No. PCT/US2021/047234, filed on Aug. 24, 2021, and which claims priority to U.S. Provisional Application No. 63/069,170, filed on Aug. 24, 2020 which are herein incorporated by reference in their entirety.

FIELD

The present teachings relate to both position-to-optical and rotation-to-optical displacement sensors, more particularly to a miniature, micrometer-accuracy, three-dimensional (3D) position-to-optical and rotation-to-optical displacement sensor.

BACKGROUND

The statements in this section merely provide background information related to the present disclosure and may not constitute prior art.

Extrinsic Fabry-Perot Interferometers (EFPI) have been widely used to measure various physical parameters such as strain, temperature, pressure, and displacement. Typically, a EFPI comprises two parallel reflective surfaces with a cavity along an optical fiber. When incident light is sent through the fiber, the two surfaces generate two reflection waves with a time delay, inducing an interference fringe pattern in the output spectrum. The fringe pattern is a function of power intensity and the cavity length. Therefore, the cavity length can be determined from signal processing of the output spectrum, given the input light energy of a laser source. At the location of an EFPI, the two sides of an optic fiber are usually fixed on a substrate and aligned in a collimated capillary tube. Such an application has three disadvantages. First, since the reflectivity of the fiber core is relatively low, the Q-factor or finesse of the optic fiber based EFPI sensor is low. Second, the alignment and installation of the two fibers into the capillary tube are time-consuming and fragile due to the small (8.2 μm) core diameter of the fiber. Third, the optic fiber based EFPI sensors can only measure cavity change in the direction of light propagation, limiting potential applications.

SUMMARY

The present disclosure introduces a miniature, micrometer-accuracy, three-dimensional (3D) position-to-optical displacement sensor that is composed of an extrinsic Fabry-Perot interferometer (EFPI) in Z-direction and a series of plasmonic metasurface resonators with distinctive wavelength-selective characteristics in X- and Y-directions. The interferometer comprises a single mode optic fiber for light propagation, a glass tube to hold the fiber for robust and safe measurements in laboratory testing, and a substrate mirror configured to create a light interference fringe as a function of cavity (distance) between the mirror and the end of the optic fiber. Each plasmonic resonator that modifies the substrate mirror is a pattern of multiple unit cells that are distributed in a two-dimensional (2D) square lattice in the X-Y plane. The nanostructure unit cells are inscribed in the top layer of a three-layer thin film via the focused ion beam (FIB). The key parameters affecting the light reflection property of a metasurface include the thicknesses of three layers, the size and shape of the nanostructure unit cell, and the spatial period between two adjacent unit cells. The measurement principle of the sensor is an integration of light fringes from the interferometer and light reflections from the resonators.

The present disclosure also introduces a miniature, micrometer-accuracy, three-dimensional (3D) rotation-to-optical displacement sensor that is composed of three extrinsic Fabry-Perot interferometers (EFPIs) in Z-direction and a series of plasmonic metasurface resonators with distinctive wavelength-selective characteristics in X and Y directions. In this case, the three optical fibers can be bundled together to form a tri-interferometer together with a metasurface mirror of the resonators. Each optical fiber produces a 3D position change and, together, they are used to determine three rotational displacements, which is important to assess the structural condition of laminated structures under combined torsional and bending loads. More specifically, the sensor of the present disclosure measures three component translational displacements directly and three component rotational displacements indirectly by transforming position changes in three fibers (as shown in the embodiment of FIG. 3) into three rotational components.

The present disclosure also introduces a prototype manufacturing process of a tri-interferometer. The tri-interferometer comprises four main parts. The first part is a thin film metasurface-based sensing element attached to a thick substrate with silicon. The second part is a flexible viscoelastic (Sorbothane) ring that is adhesively (or otherwise) adhered to the sensing element. The third part is a plate. The last part includes three optical fibers bundled together that pass through a pre-drilled hole in the third part. The packaged tri-interferometer is completed after the hole is sealed with a suitable adhesive (e.g., a super glue, which is typically a cyanoacrylate glue that is comprised of an acrylic resin that transforms to a plastic state after curing) to ensure that no moisture will enter into the viscoelastic ring and that the optical fibers will move together with the third part. In engineering applications, the first and third parts represent the two layers of a composite structure, forming an interface whose condition is being assessed.

Additionally, the present disclosure provides, a high-accuracy, two-dimensional (2D) displacement sensor that is based on the concept of a Extrinsic Fabry-Perot Interferometer (EFPI). The sensor is comprised of two bundled single-mode optic fibers in parallel and two plasmonic metasurface resonators inscribed on a gold substrate via focused ion beam (FIB). The fiber end surface and the metasurface are in parallel with a small cavity in between. The cavity change or Z-component displacement is determined from the pattern of interference fringes. The X-component displacement, perpendicular to the Z-component, is identified from wavelength-selective metasurface resonators, which possess unique resonant wavelengths due to different nanostructure designs. In various instances, the sensor can be calibrated with three displacements applied through a 3-axis precision linear stage. Test results indicated that the interferometer of the present disclosure can measure three-dimensional displacements (up to about 450 μm) with a maximum error of about 5.4 μm or about 2.2%.

This summary is provided merely for purposes of summarizing various example embodiments of the present disclosure so as to provide a basic understanding of various aspects of the teachings herein. Various embodiments, aspects, and advantages will become apparent from the following detailed description taken in conjunction with the accompanying drawings which illustrate, by way of example, the principles of the described embodiments. Accordingly, it should be understood that the description and specific examples set forth herein are intended for purposes of illustration only and are not intended to limit the scope of the present teachings.

BRIEF DESCRIPTION OF THE DRAWINGS

The drawings described herein are for illustration purposes only and are not intended to limit the scope of the present teachings in any way.

FIG. 4A is a cross-shaped unit cell nanostructure of the present disclosure shown on an enlarged scale where the cross-shaped unit cell has a cross width "w", and where FIG. 4B is a scanning electron microscope (SEM) image of 60 μm×60 μm metasurface having a plurality of cross-shaped unit cells (as illustrated in FIG. 4A) arranged in a two dimensional array on a mirror or other target, in accordance with various embodiments of the present disclosure.

FIGS. 5A and 5B are exemplary illustrations of the reflection spectra of metasurfaces with various cross widths w, where FIG. 5A illustrates numerical simulations, and where FIG. 5B illustrates experimental results, in accordance with various embodiments of the present disclosure.

FIG. 9A is a chart illustrating resonant wavelengths extracted from an individual resonator A or B using one EFPI of the present disclosure, where FIG. 9B illustrates the two resonators as shown in FIG. 6B, and where FIG. 9C illustrates a combined resonant wavelength output versus the X coordinate from the EFPI, in accordance with various embodiments of the present disclosure.

Corresponding reference numerals indicate corresponding parts throughout the several views of drawings.

DETAILED DESCRIPTION OF PREFERRED EMBODIMENTS

Figure 1A:
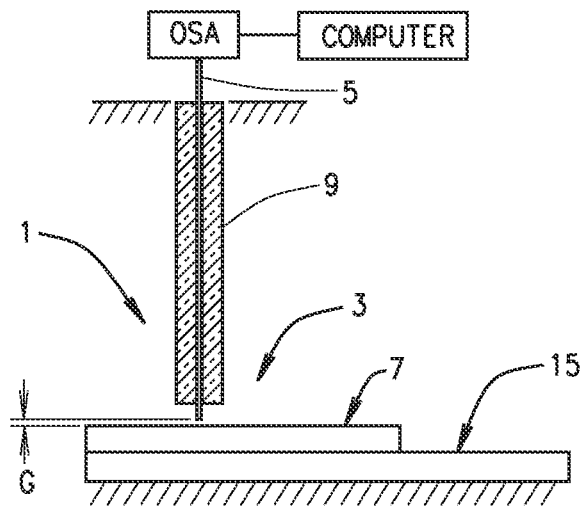
FIG. 1A is an exemplary side view of an extrinsic Fabry-Perot interferometer (EFPI) that is fixed on a free stand near an adjustable position fixture or test setup as shown in FIG. 6A, in accordance with various embodiments of the present disclosure.

The following description is merely exemplary in nature and is in no way intended to limit the present teachings, application, or uses. Throughout this specification, like reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of skill in the art but are not intended to be manufacturing level drawings or renditions of final products and may include simplified conceptual views to facilitate understanding or explanation. As well, the relative size and arrangement of the components may differ from that shown and still operate within the spirit of the invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises", "comprising", "including", and "having" are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on", "engaged to or with", "connected to or with", or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region, or section, etc., is referred to as being "directly on", "directly engaged to", "directly connected to", or "directly coupled to" another element, object, device, apparatus, component, region, or section, etc., there may be no intervening elements, objects, devices, apparatuses, components, regions, or sections, etc., present. Other words used to describe the relationship between elements, objects, devices, apparatuses, components, regions, or sections, etc., should be interpreted in a like fashion (e.g., "between" versus "directly between", "adjacent" versus "directly adjacent", etc.).

As used herein the phrase "operably connected to" will be understood to mean there are more elements, objects, devices, apparatuses, components, etc., that are directly or indirectly connected to each other in an operational and/or cooperative manner such that operation or function of at least one of the elements, objects, devices, apparatuses, components, etc., imparts and causes operation or function of at least one other of the elements, objects, devices, apparatuses, components, etc. Such imparting or causing of operation or function can be unilateral or bilateral.

As used herein, the term "and/or" includes any and all combinations of one or more of the associated listed items. For example, A and/or B includes A alone, or B alone, or both A and B.

Although the terms first, second, third, etc. can be used herein to describe various elements, objects, devices, apparatuses, components, regions, or sections, etc., these elements, objects, devices, apparatuses, components, regions, or sections, etc., should not be limited by these terms. These terms may be used only to distinguish one element, object, device, apparatus, component, region, or section, etc., from another element, object, device, apparatus, component, region, or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) taught herein, and because many modifications may be made in the embodiments described herein, it is to be understood that the details herein are to be interpreted as illustrative and non-limiting.

Figure 2:
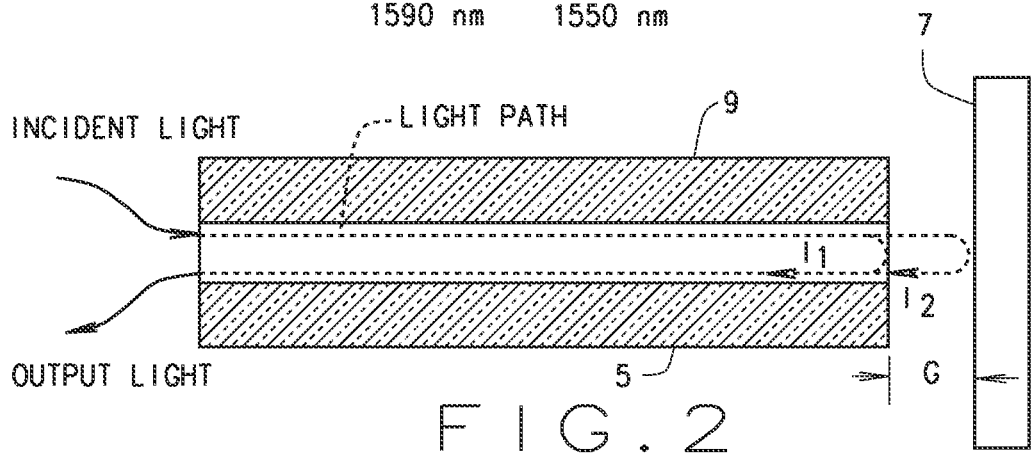
FIG. 2 is an exemplary illustration on an enlarged scale of an Interference Principle of the EFPI having an optical fiber which has a glass core of an optical fiber disposed within a cladding of the optical fiber, where the distal end of the optical fiber is spaced relative to a mirror with a gap G therebetween, in accordance with various embodiments of the present disclosure.
Figure 6A:
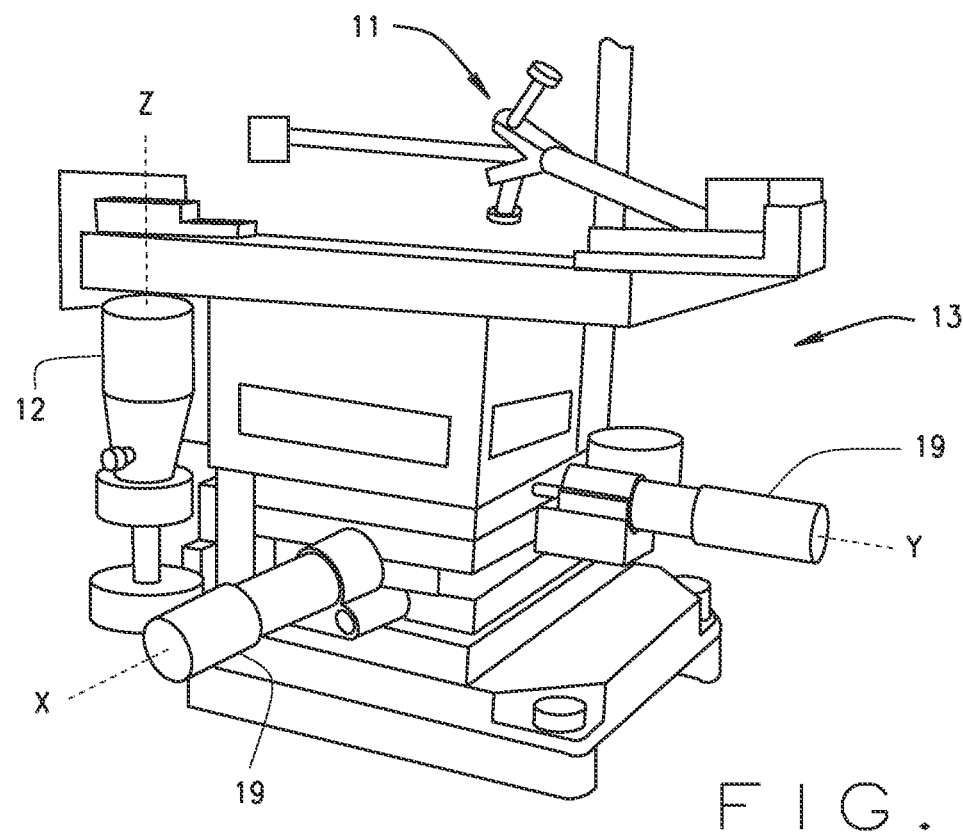
FIG. 6A is a perspective view of a three dimensional (3D) test fixture for holding the metasurface (a mirror of the EFPI) of the present disclosure within an test cavity (not shown) within the fixture accurately adjustable with micrometer precision along the X, Y and Z axes so as to adjust the cavity length, as shown by gap G in FIGS. 1A and 2, between the distal end of the optical fiber extending beyond the distal end of the tube and its target (such as, a mirror)

Referring now to the drawings, and particularly to FIG. 1A, a miniature, micrometer-accuracy, three-dimensional (3D) position-to-optical displacement sensor of the present disclosure is indicated in its entirety at 1. More particularly, sensor 1 is shown to comprise an Extrinsic Fabry-Perot Interferometer (EFPI), as generally indicated at 3, composed of a glass optic fiber 5 and a gold surface mirror 7 with a small gap G (as will be described in detail hereinafter) between the distal end of the fiber and the mirror (as shown in FIGS. 1A and 2). As shown in FIG. 1A, the optical fiber 5 has a glass having a diameter about 8.2 µm of an optical fiber disposed within cladding of about 12.5 µm in diameter thereby to facilitate laboratory handling of the optical fiber, measuring, and testing, test setup and measurement. More specifically, fiber 5 is inserted through a small bore capillary transparent tube 9 of suitable cladding material and is fixed within the tube by a suitable adhesive. The proximal end of the glass fiber 5 is optically connected to an optical spectrum analyzer (OSA) and computer is provided for data acquisition, as shown in FIG. 1A. Preferably, optical fiber 5 is a single mode optic fiber, for example a Corning SMF-28 glass fiber commercially available from Corning Incorporated of Corning, New York, USA, for light propagation. The tube 9 is fixed on a stand-alone supporter 11, which is part of a test fixture 13 (as shown in FIG. 6A) as will be described hereinafter. Located on an anvil or test bed 15 (see FIG. 1A) underneath the glass fiber 5 is the above-mentioned mirror 7, which is moveable relative to the test bed in the X-Y direction. The supporter 11 holding glass fiber 5 is fixedly mounted relative to the test fixture 13 and is not movable with respect to the test bed 15, as shown by the dashed line shading in FIG. 1A. A more detailed description of FIG. 2 is set forth in [0045] and [0051], hereinafter.

A gap G between the distal end of optic fiber 5 and the gold surface of mirror 7 is established in a manner as will be describe and this gap may range between about 50 µm and about 500 µm, and more preferably between about 200 µm and about 400 µm, and even more preferably between about 250 µm and about 350 µm, where the smaller the gap the more accurate the measurement. The mirror 7 has a series of plasmonic metasurface resonators, as generally indicated M or 17 in FIG. 4B, and which are shown as an array of such resonators in FIG. 1B and are affixed to (or more preferably formed in) the gold surface of mirror 7. The mirror is movably supported in the X-Y direction on test bed 15 and the optic fiber 5 is movable relative to the test bed along the Z axis by means of the 3-axis high-precision linear stage test fixture 13, as shown in FIG. 6A. The test fixture 13 has three hand operated micrometer adjustment knobs 19 for respectively precisely adjusting the mirror 7 within the test fixture 13 along the X or Y axes. The distance that the distal end of fiber 5 is spaced from the mirror may be adjusted along the Z axis by the test fixture. In this manner, the distal end of fiber 5, as shown in FIG. 1A, may be accurately positioned to establish the desired gap G between the distal end of fiber 5 and mirror 7.

Figure 3:
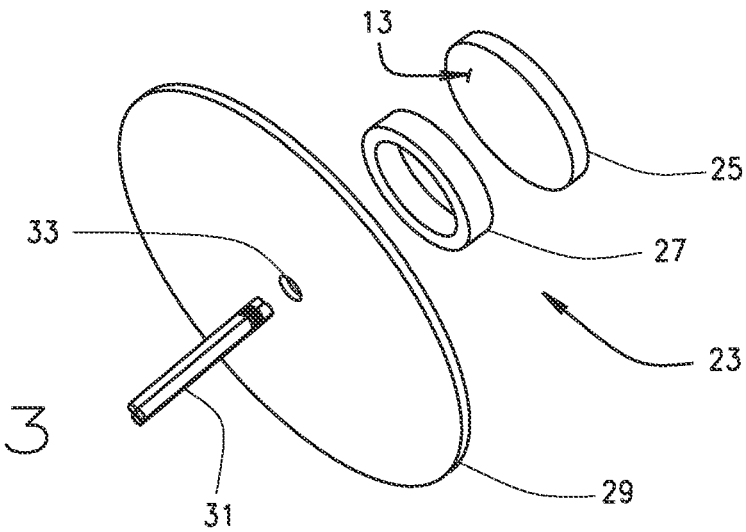
FIG. 3 is an exemplary illustration of a tri-interferometer of the present disclosure packaged for a practical application, with the parts and the assembly of the packaged interferometer shown in an exploded view, in accordance with various embodiments of the present disclosure.
Figure 4A:
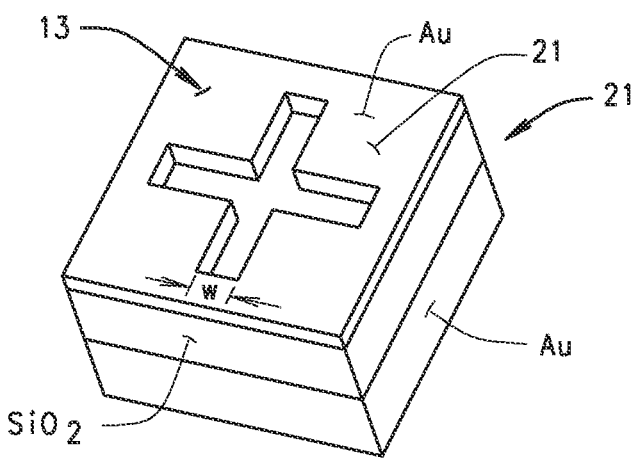
FIGS. 4A and 4B are exemplary illustrations of a plasmonic metasurface as applied to a target where
Figure 4B:
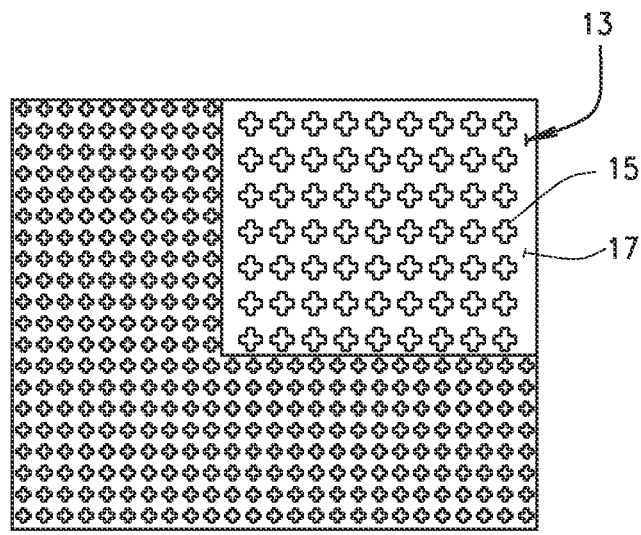

As illustrated in FIG. 4A, each the metasurface resonator 17 or M is preferably fabricated through thin film deposition of Au—SiO$_2$—Au in three layers on a thick glass substrate (not shown in FIG. 4A, supporting sensing element 25 in FIG. 3 in application) with an electron-beam evaporator thus forming each plasmonic nanostructure unit cell 21. Each unit cell is milled with a focused ion beam (FIB) on the top Au thin film to form the plasmonic nanostructures. More specifically, FIG. 4A illustrates a cross-shaped nanostructure unit cell 21 located on the top layer of an Au—SiO$_2$—Au three-layer thin film. Multiple such unit cells 21 are arranged in a two-dimensional square lattice or array, as shown in FIG. 4B, to form a plasmonic metasurface 17. Defined primarily by the thicknesses of top Au layer and underlying SiO$_2$ layer, the length and especially the width (w) of the cross-shape nanostructure unit cells 21, and the spatial period between two adjacent unit cells, the metasurface resonators 17 are designed to have a resonance wavelength of about 1460 nm to about 1620 nm. The electro-magnetic field distribution at resonant wavelength of the metasurface indicates that antiparallel current is excited in the top and bottom gold film. A magnetic resonance is formed by the circulated currents and then interacted with the magnetic field of the incident light. Therefore, an enhanced magnetic field is established and confined in the middle SiO$_2$ dielectric layer. The electric field is mostly concentrated at the bottom side of the top gold layer. A strong electric dipole resonance is generated by the accumulated polarized positive and negative charges at the right and left corners of the cross shaped aperture. The combination of the electric dipole and magnetic dipole resonance results in the matched impedance to free space and leads to the selective resonant wavelength tuned by selecting different values of the width w of the cross-shape nanostructure of the resonator as shown in FIG. 4A.

The upper part of the sensor (i.e., the glass fiber 5) is fixed on the free stand supporter 11 which is part of the test fixture 13, as shown in FIG. 6A. The lower part of the sensor (i.e., the mirror 7) is installed on the test bed 15 of the 3-axis dimensionally adjustable test fixture 13, as illustrated in FIG. 6A, which is used to adjust and control the relative displacement between the distal end of the optical fiber 5 and the surface mirror 7 in three dimensions along an X-Y-Z axis system by means of micrometer adjustment knobs 19 as are well known to those familiar with such test fixtures. In this manner, the distal end of fiber 5 and the mirror 7 may be accurately and adjustably positioned within the test fixture 13 so as to accurately establish the desired (or predetermined) gap G between the distal end of the fiber 5 and the mirror 7. Each of the plasmonic metasurface resonators 17 has a distinctive wavelength-selective characteristic in the X and Y directions for purposes as will appear and as will be hereinafter described. The capillary glass tube 9 surrounds and holds the distal end optic fiber 5 in position within the chamber for robust and safe measurements without movement of or damage to the fiber 5. This in combination with the 3-axis adjustment of the test fixture allows a desired gap G between the distal end of the fiber 5 and mirror 7 to be determined, where the gap G preferably ranges between about 50-500 μm.

Figure 1B:
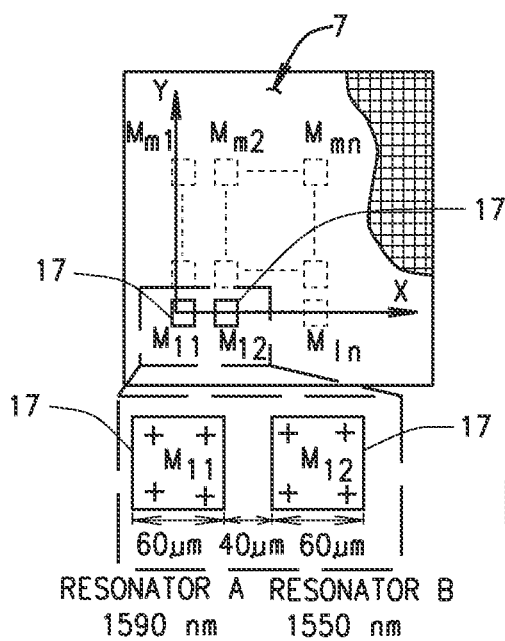
FIG. 1B is a top plan view of a portion of a mirror having an array of plasmonic metasurfaces formed thereon, in accordance with various embodiments of the present disclosure.

The optical fiber 5 and the substrate mirror 7 together create a light interference fringe as a function of cavity distance (i.e., gap G) between the mirror and the distal end of the optic fiber, as it is positioned relative to the mirror. The fiber 5 is fixed inside the glass tube 9 that is held by the supporter or free stand 11 in close proximity to the substrate mirror 7. As shown in FIG. 1A, the mirror is movably supported on the test bed 15 of the 3-axis linear test fixture 13. Each plasmonic resonator 17 on mirror 7 is capable of modifying the substrate of the mirror by creating a matched impedance from an electric and magnetic dipole resonance and thus selective resonant wavelength tuned by adjusting the width w of the cross-shape nanostructure of the resonator, as shown in FIG. 4A, and is made up of a pattern of multiple unit cells that are distributed in a two-dimensional (2D) square lattice as shown in FIG. 4B. The lattice is an array of m×n resonators $M_{ij}$(i=1, 2, ..., m; j=1, 2, ..., n) on the X-Y plane as shown in FIG. 1B. The nanostructure unit cells 21 are inscribed in the top layer of a three-layer thin film on the surface of mirror 7 via a focused ion beam (FIB). The key parameters affecting the light reflection property of a metasurface include the thicknesses of three layers, the size and shape of the nanostructure unit cell, and the spatial period between two adjacent unit cells. The measurement principle of the sensor is an integration of light fringes from the interferometer and light reflections from the resonators. From such measurements, differential displacement can be determined.

Figure 7A:
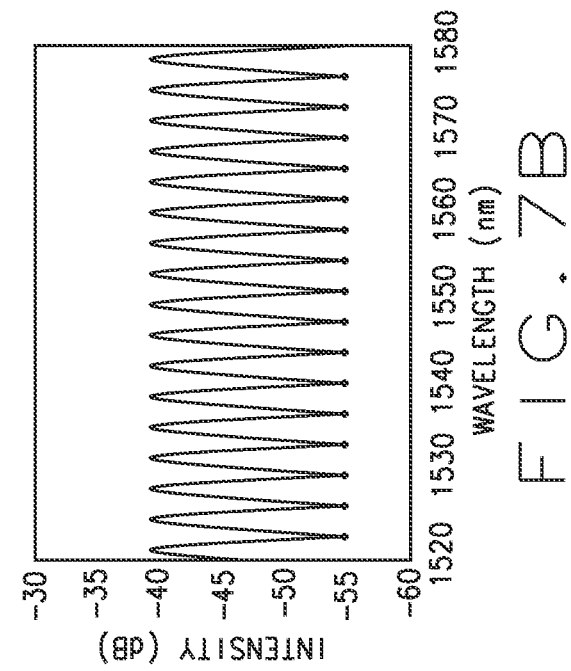
FIGS. 7A-7D are exemplary illustrations of output spectra with an optical fiber of the EFPI of the present disclosure, where the charts of FIG. 7A and FIG. 7B have a cavity length G (the distance between the end of the optical fiber and the surface of the mirror or target) of about 250 μm and about 300 μm, respectively, when perpendicular to a normal gold target surface with the cavity of the test fixture, and where FIG. 7C and FIG. 7D have a cavity length G of about 250 μm and about 300 μm, respectively, when perpendicular to a center of resonator A as shown in FIG. 6B, in accordance with various embodiments of the present disclosure.
Figure 7B:
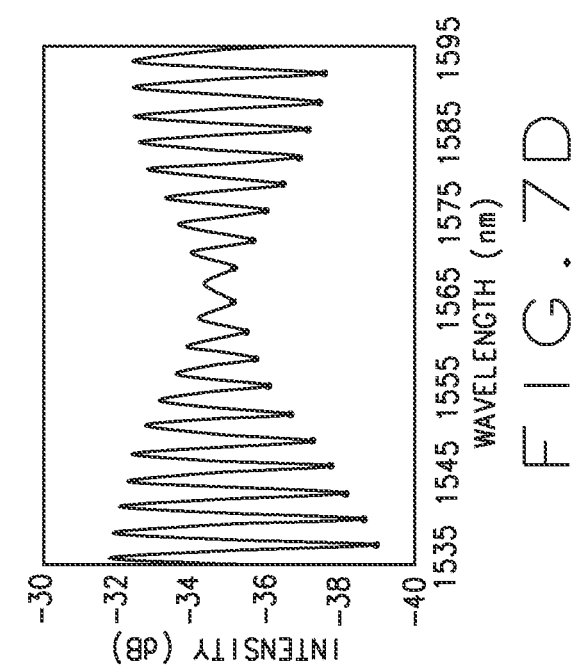

FIG. 1B illustrates a schematic design of a sensor 1 of the present disclosure for 3D displacement measurement. The single mode optic fiber 5 is inserted into the bore of the capillary glass tube 9, where the tube is fixed within the working cavity of the test fixture 13 so as to be positioned slightly apart from the metasurface substrate (the surface of mirror 7). As illustrated in FIG. 2, the optic fiber 5 has different refractive indexes in its core and cladding. When incident light is propagated through the core of the glass fiber 5, the incident light is reflected at both the distal end of the fiber 7 (represented by $I_1$) and the metasurface substrate mirror 7 (represented by $I_2$) as illustrated in FIG. 2, generating an interference fringe pattern, as illustrated in FIGS. 7A and 7B. As illustrated in FIG. 2, the light path through fiber 5 is shown by a dotted line. It will be noted that due to the differences in the index of refraction between $I_1$ and $I_2$, some of the light path extends out beyond the distal end of the fiber 5 into gap G and is reflected back around to the distal end of the fiber As previously noted, the mirror has an m×n array of metasurface resonators, as indicated at M or 17 in FIG. 1B. Each resonator has a unique resonant wavelength that may be adjusted or tuned by adjusting the parameters of nanostructure unit cells 21 that make up a resonator M. For example, two resonators $M_{11}$ and $M_{12}$ are shown in FIG. 1B where each resonator is a square 60 μm on a side with a 40 μm spacing between the two squares. Those skilled in the art will recognize that the size and shape of these resonators can be changed as needed. An X-Y Cartesian coordinate system on the mirror 7 can be set with its origin at the center and left edge of resonator $M_{11}$, with the X-axis and the Y-axis in the plane of the substrate surface, and with the Z-axis extending orthogonally along the fiber 5 direction pointing upward from mirror 7. An example test setup is shown in FIG. 6A, where the test fixture 13 is a 3-way linear stage (such as a Newport 562 linear stage test fixture commercially available from Newport Corporation of Irvine, California) that is manually adjustable in the X, Y and Z directions using micrometer adjustment handles 19, as shown in FIG. 6A, with about 0.5 μm in displacement accuracy.

The reflection spectrum of the interferometer is acquired by an optical interrogator (e.g., a Micron Optics SI 255 optical integrator that is commercially available from Micron Optics of Chamblee, Georgia) or a general optical spectrum analyzer (OSA) as shown in FIG. 1A and saved in a computer (as shown in FIG. 1A) for further signal decoding.

FIG. 2 illustrates the Z-direction displacement sensing principle of the interferometer (sensor 1) of the present disclosure. When incident light is propagated through the core of the glass fiber 5, incident light is reflected at both the distal end of the fiber and the metasurface substrate. In FIG. 2, the path of the incident light and of the output light through the core of fiber 5 is depicted by the dashed line. This generates an interference fringe pattern as illustrated in FIGS. 7A-7D. With a prior knowledge of the distribution and coordinates of various resonators 17 on the mirror 7, the interference fringe pattern is intertwined with the reflection property of the metasurfaces. Thus, by discriminating the light reflection property from the interference fringe pattern, the X and Y coordinates of corresponding resonators can be determined. Also see [0051] for still more details regarding to the combined reflection light (I from the reflection light at the distal end of the fiber 11 and the reflection light from the mirror 12) and resulting fringe pattern as shown in FIG. 7.

Figure 6B:
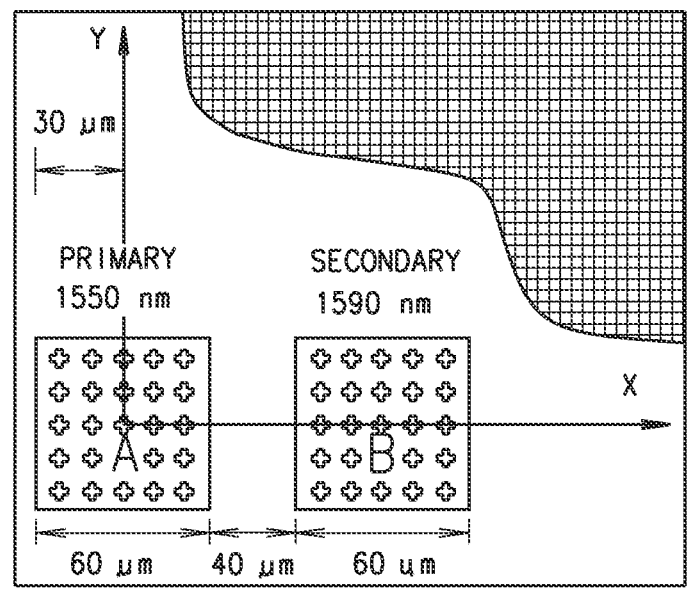
FIG. 6B is a top plan view of the target of the EFPI (a special case of FIG. 1b for 2D displacement measurement), as installed in the test cavity of the fixture having a plurality of metasurfaces on the target (as shown by the square grid array on the target or mirror).

Test data of two resonators, $M_{11}$ (Resonator A) and $M_{12}$ (Resonator B), as shown in FIG. 1B, 6B, or 9B, are analyzed to demonstrate the case for 2D measurements. Test results indicated an accuracy of ±5.4 µm in displacement measurement. Technical details are described further below under the heading "2D Displacement Interferometer".

FIG. 3 shows the schematic design of a packaged tri-interferometer of the present disclosure, as generally indicated at 23, for practical applications. The packaged interferometer 23 includes four parts. The first part is a thin film metasurface-based sensing element 25 attached to a thick substrate. Silicon is preferred in final sensor packaging for applications, but other substrates may be used, which will be shaped and sized by practical needs. The second part is a flexible viscoelastic material (e.g., Sorbothane) ring 27 that is adhesively adhered (glued) or otherwise suitably attached to the sensing element 25 and a plate 29. More particularly, ring 27 encloses three optical fibers 31 bundled together that pass through a pre-drilled hole 33 in plate 29. The packaged tri-interferometer 23 is completed after the hole 33 is sealed with a suitable adhesive, such as super glues (as above described) or other suitable adhesive/sealants to ensure that no moisture will enter into the viscoelastic ring 27 and to further ensure that the optical fibers 31 will move together with the plate 29. The use of three optical fibers allows rotational displacement measurements in addition to linear or translational displacement measurements with individual fibers in order to understand six degrees of freedom movement and thus the structural condition between two parts of a composite structure. As noted in [0006], the tri-interferometer 23 measures three component translational displacements directly and measures three-component rotational displacements indirectly by transforming position changes in the three fibers 31 into three rotational components. In essence, the sensor (i.e., the packaged tri-interferometer 23) measures three component translational displacements from each of the three fibers 31. From this information, the translational displacements can be transformed into three rotational components.

It is envisioned that at least some of the novel aspects of present disclosure include: 1) use of a gold surface to increase the reflectivity and thus the Q-factor of EFPIs for accurate and reliable measurements; 2) introduction of metasurfaces for wavelength-selective reflectivity; 3) integration of optical interference and reflection for enabling 3D displacement measurements; and 4) packaging into a miniature device for possible embedment during material processing or structural formation in applications.

In terms of displacement measurement, the competing technology of the position-to-optical sensor 1 of the present disclosure is a known position-to-electrical sensor called Linear Variable Differential Transformer (LVDT). A LVDT is an electromechanical transducer that converts the rectilinear motion of an object to which it is mechanically coupled into a corresponding electrical signal. Such LVDT transducers are widely used in many applications, such as aerospace, computerized manufacturing, hydraulics, machine-tools, material testing, nuclear reactors, power turbines, process and control, robotics, satellites, servo mechanisms, and weight sensitive applications. The LVDT is a technology for critical and reliable linear displacement measurements in industrial, military, aerospace, subsea, downhole drilling, nuclear power, and process control applications. A LVDT outputs voltage that is proportional to the position of a movable magnetic core. Various LVDTs provide a wide range of distance measurement from ±100 µm to ±25 µm. According to the ASTM E2309 Standards published in 2005, the most stringent measurement accuracy requirement for LVDTs and any other displacement transducers is Class A (±25 µm).

In comparison with known LVDT technology, the advantages of the present disclosure include its compactness for potential integration in 3D printing of composite materials, its micrometer accuracy for precision displacement measurement (e.g., approximately 5 times more accurate), its 3D capability for spatial displacement measurement, and its optical measurement for industrial applications with the presence of electromagnetic interferences.

2D Displacement Interferometer

Plasmonic metasurface technology has received increasing attention in next-generation structural color filtering and printing applications. Recently, various types of metasurfaces in infrared range have been achieved to realize infrared perfect absorbers and optical index sensing. Since the wavelength range of a metasurface resonator contains a low attenuation band of the optic fiber, the combination of the optic fiber based EFPI and the wavelength-selective metasurface resonator is feasible and promising for 2D displacement sensor design.

In the present disclosure, a 2D displacement sensor with high accuracy is achieved based on the EFPI and wavelength-selective plasmonic metasurfaces. The cavity (gap G) change between the optic fiber distal end and the metasurface substrate is designated as a Z-component displacement. The metasurface arrays on the substrate with various resonant wavelengths are used to determine a X-component displacement. Compared with traditional known EFPI sensors, the interferometer of the present disclosure has three main advantages. First, the gold metasurface substrate has higher reflectivity, which increases the Q-factor of the cavity and thus improves the sensor resolution. Second, the fabrication process of an optical fiber against a gold substrate is easier and more robust. Third, the interferometer responds to two orthogonal components of a displacement.

As previously described, FIG. 4A shows a cross-shaped nanostructure unit cell 21 located on the top layer of an Au—$SiO_2$—Au three-layer thin film. Multiple unit cells 21 are arranged in a 2D square lattice or array, as shown in the scanning electron microscope (SEM) pictures (FIG. 4B), to form a plasmonic metasurface 17. Defined by the layer thicknesses of Au and $SiO_2$ films, the length and width w of the cross-shape nanostructure unit cells 21 and the spatial period between two adjacent unit cells, the metasurface resonators are designed to have a resonant wavelength of 1460 nm to 1620 nm. FIG. 5A presents the simulated reflection spectra of four metasurfaces with different widths, w=80 nm~140 nm, when spatial period=670 nm, cross length=500 nm, top Au layer thickness=55 nm, middle $SiO_2$ layer thickness=145 nm, and bottom Au layer thickness=200 nm. Design resonant wavelengths from 1550 nm to 1650 nm are achieved and verified by the numerical simulations.

Four designed metasurfaces were fabricated through thin film deposition of Au—$SiO_2$—Au three layers on a thick glass substrate (not shown in FIG. 4A) with an electron-beam evaporator and focused ion beam (FIB) milling of the top Au thin film to form the plasmonic nanostructures directly. Scanning electron microscope (SEM) image of a 60 μm×60 μm metasurface with cross w=90 nm is shown in FIG. 4B. Reflection spectra of the four metasurfaces, as shown in FIG. 5B, were measured with a Fourier Transform Infrared (FTIR) spectrometer (Thermo Scientific Nicolet 6700 spectrometer) and a liquid Nitrogen (LN$_2$) cooled MCT detector (Infrared Associates Inc. of Stuart, Florida). The measured reflection spectra clearly demonstrated wavelength-selective features of the metasurfaces with distinguishable resonant wavelengths, which agree well with the simulated results in FIG. 5A. The differences in resonant wavelength, especially when w<100 nm, are likely attributed to small discrepancies between the designed and the fabricated nanostructures.

The physical mechanism of the metasurface resonator was comprehensively investigated in previous work. Numerical simulation of the electromagnetic field distribution at resonant wavelength indicated that antiparallel currents were excited in the top and bottom gold films. A magnetic resonance was formed by the circulated currents and then interacted with the magnetic field of the incident light. Therefore, an enhanced magnetic field was established and confined in the middle SiO$_2$ dielectric layer as indicated in FIG. 4A. The electric field was mostly concentrated at the bottom side of the top gold layer. A strong electric dipole resonance was generated by the accumulated polarized positive and negative charges at the right and left corners of the cross shaped aperture. The combination of the electric dipole and magnetic dipole resonance resulted in the matched impedance to free space and led to the selective resonant wavelength tuned by adjusting the width w of the cross-shape nanostructure of the resonator.

Numerical simulation about the effect of incident angle on the resonator have also been previously conducted. For TE polarization, the resonant wavelength was angle insensitive, but the reflection intensity increased with larger incident angle since the circulated currents cannot be driven effectively by the smaller horizontal magnetic field component at larger incident angles. For TM polarization, the resonant wavelength remained stable before θ=20° and then slightly shifted to larger wavelengths due to the weak surface wave coupling between adjacent resonators. On the other hand, the reflection intensity remained 70% of the original value before θ=80°. Therefore, the incident angle should be controlled within 20° for sensor design to minimize the wavelength shift effect.

The design and test setup of an interferometer or sensor 1 of the present disclosure is installed in a three-dimensional (3D) test fixture 13 which was used to demonstrate the new miniature, micrometer-accuracy, three-dimensional (3D) displacement-to-optical displacement sensor 1. Two single mode optic fibers (e.g., Corning SMF-28) were bundled in parallel and inserted into a capillary glass tube that was fixed slightly above the metasurface substrate with the inscription of a primary resonator A (1550 nm) and a secondary resonator B (1590 nm). Each resonator has a unique resonant wavelength by adjusting the width w of the cross-shape nanostructure as shown in FIG. 4A. The distance between the two resonators is 40 μm, as shown in FIG. 6B. The Cartesian coordinate system was set with its origin at the center of the primary resonator A, X-axis and Y-axis in the substrate surface, and Z-axis along the fiber direction pointing upward. The substrate is fixed on the test bedv15 of a 3-way linear stage test fixture 13 (e.g., Newport 562) with about 0.5 μm in displacement accuracy. The reflection spectrum of the interferometer is acquired by an optical interrogator (e.g., Micron Optics SI 255) and saved in a computer for further signal decoding, as shown in FIG. 1A.

As described above, FIG. 2 illustrates the Z-direction displacement sensing principle of the interferometer of the present disclosure. When propagating through the optical fiber, incident light will be reflected at both the fiber end and the metasurface substrate and will generate an interference fringe pattern. Although the reflected light from the metasurface is affected by its nanostructure design, the total intensity of the output signal can be approximated by $$I = I_1 + I_2 + 2\sqrt{I_1 I_2} \cos\left(\frac{4\pi n_0 L}{\lambda} + \varphi_0\right) \quad (1)$$

where I is the output intensity of the interferometer, $l_1$ and $l_2$ are the reflected light intensity at the fiber end surface and metasurface, respectively, L is the cavity length, $n_0=1$ (in air) is the refractive index of cavity medium, $\varphi_0$ is the initial phase and λ is the wavelength of the reflected light. In the output spectrum of a traditional EFPI, as shown in FIG. 7A, two adjacent valleys have the phase difference of 2π. That is, $$\frac{4\pi L}{\lambda_1} - \frac{4\pi L}{\lambda_2} = 2\pi \quad (2)$$

Therefore, the cavity length L can be determined by:

$$L = \frac{\lambda_1 \lambda_2}{2(\lambda_1 - \lambda_2)} \quad (3)$$

Figure 7C:
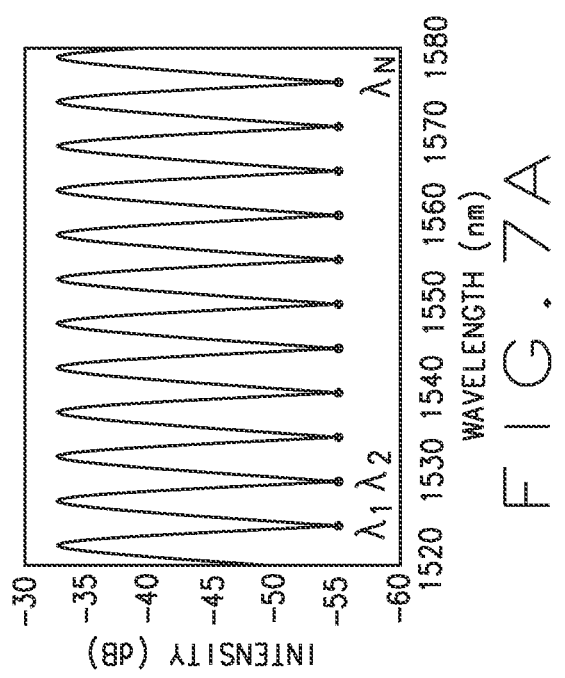
Figure 7D:
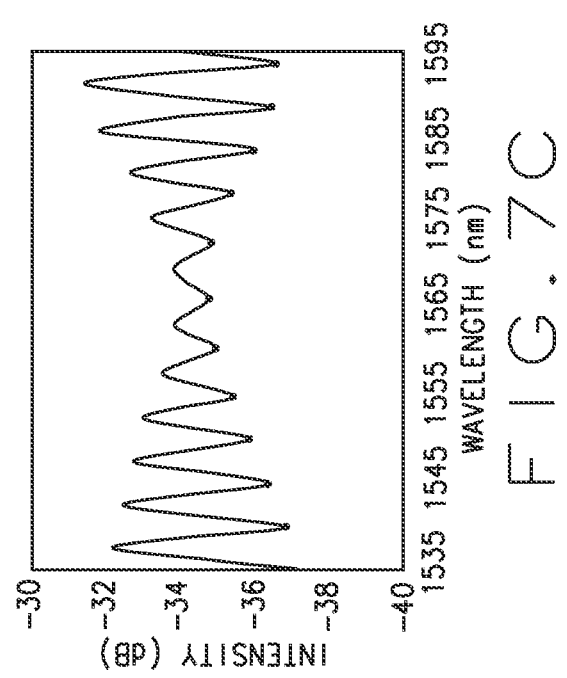

To validate the Z-direction displacement sensing, one optic fiber pointed at the gold surface and the resonator B with two different cavity lengths (i.e., two gap Gs). When the optic fiber pointed at the gold surface, the output spectra of the sensor were recorded as shown in FIGS. 7A and 7B. The wavelength at each marked valley in FIGS. 7A and 7B was extracted from the spectra. Two adjacent wavelengths between $\lambda_1$ and $\lambda_N$ were then used to obtain a cavity length (gap G) from equation (3). Multiple cavity lengths determined were averaged as a high accuracy representation of the Z-component displacement applied. When the optic fiber pointed at the resonator, the output spectra of the sensor were recorded as shown in FIGS. 7C and 7D. In this case, the EFPI interference pattern was coupled with the reflection spectrum of the resonator, but the marked valleys can still be identified from the coupled spectra to calculate the cavity length of the sensor.

Table 1 compares the set and measured values of cavity lengths in each case. The measured cavity lengths from the primary resonator B are slightly larger than from the gold surface with a maximum error of 2.0%. Thus, replacing the gold surface with the resonator changes little of the cavity length. Therefore, equation (3) can be used in both cases to acquire the cavity length accurately for the measurement of Z-component displacement.

TABLE 1

Comparison of the set of measured cavity lengths

| Fiber Position | Set Cavity Length (μm) | Measured Cavity Length (μm) | Error (%) |
|---|---|---|---|
| Gold Surface | 250 | 252 | 0.8 |
| | 300 | 304 | 1.3 |
| Resonator B | 250 | 254 | 1.6 |
| | 300 | 306 | 2.0 |

Figure 8A:
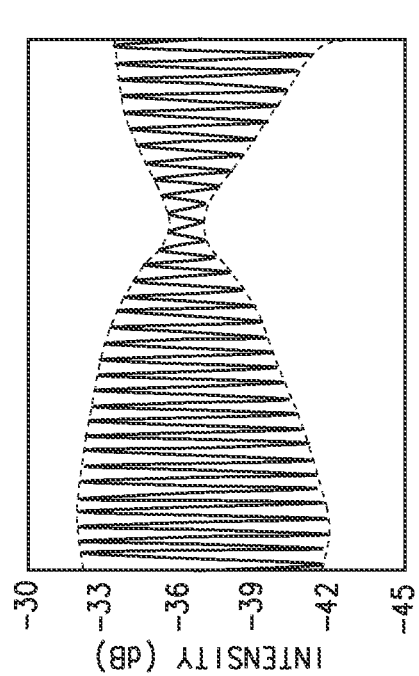
FIGS. 8A-8B exemplary illustrations of output spectra of the interferometer of the present disclosure when an optical fiber is placed directly above the center of resonators A and B, where
Figure 8B:
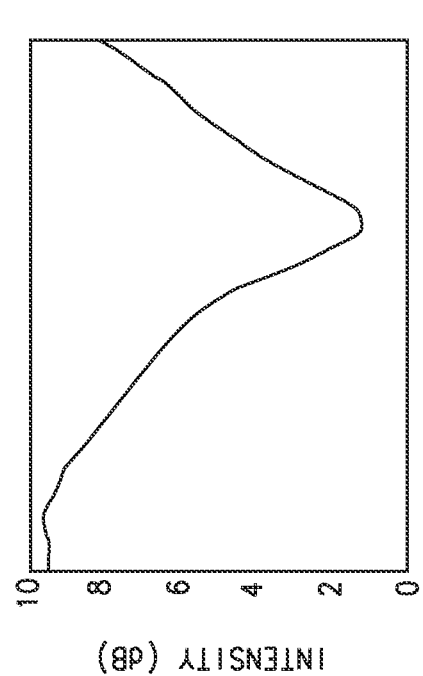
Figure 8C:
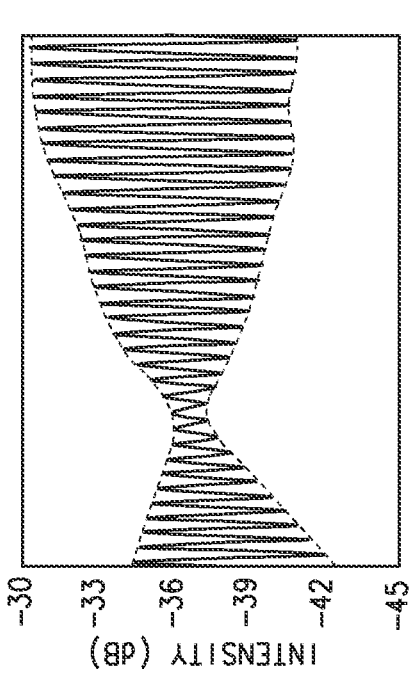
FIGS. 8C and 8D illustrate extracted reflection spectra reflecting the effect of the resonators, in accordance with various embodiments of the present disclosure.
Figure 8D:
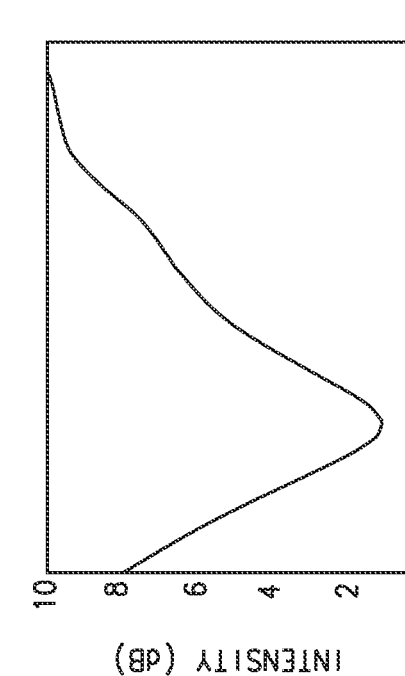

For the X component displacement sensing, the reflection spectrum of a resonator is utilized. When the optic fiber pointed at the resonator A or B with a cavity length of 350 μm, the output spectrum of the sensor was recorded as shown in FIG. 8A or 8B. By connecting all the peak (or valley) points of each output spectrum, the upper (or lower) envelope of the spectrum was obtained as outlined in FIG. 8A or 8B. The difference between the upper and lower envelopes was then calculated to determine the reflection spectrum associated with the resonator A or B. As shown in FIGS. 8C and 8D, the resonant wavelengths corresponding to each valley in the reflection spectra are 1523 nm and 1569 nm for resonator A and B, respectively, with a maximum error of 1.7% compared to the designed value (1550 nm and 1590 nm for resonator A and B).

FIG. 9A shows the resonant wavelengths extracted from the reflection spectra of the resonators A and B. When one fiber scans from the center to two edges of each resonator, the resonant wavelength decreases. This is because an increasing portion of the laser beam emitting from the fiber core is shot on the gold surface instead of the resonator. The size (60 μm in X-direction) of each resonator is in the same order of the diameter of a diverged light beam emitting from the fiber core to the metasurface, corresponding to a reduced light intensity of $1/e^2$ with Gaussian distribution, which is approximately 50 μm to 90 μm for a cavity length of 250 μm to 450 μm. It seems that the resonant wavelength decreases linearly from the center to two edges in a symmetric manner.

To achieve monotonic displacement sensing in the X direction, two parallel optic fibers were bundled together with 130 μm in center-to-center spacing. As illustrated in FIG. 9B in plan view, when one fiber (green) moved from the left edge to the center of the primary resonator A, the other fiber (purple) moved from the center to the right edge of the secondary resonator B. In this range, the resonant wavelength extracted from the purple fiber on the secondary resonator was higher than that from the green fiber. When the green fiber moved from the center to the right edge of the primary resonator A, the purple fiber moved to the gold surface with no reflection spectrum observed and thus zero resonant wavelength assigned. In this study, the larger of the two resonant wavelengths from the two individual optic fibers is utilized in displacement sensing. As a result, the resonant wavelength extracted from the two fibers bundled together decreases linearly with the X coordinate, as shown in FIG. 9C.

To investigate the feasibility and accuracy of the proposed interferometer in 2D coordinate sensing, the primary resonator A was scanned three times at a cavity length of L=250, 350, and 450 μm, respectively, at each of the two locations of X=−10 μm and X=10 μm set by the precision three-way linear stage. The coordinates in X and Z directions were identified using the proposed method discussed above. Table 2 compares the set and measured (X, Z) coordinates with a maximum root-mean-square error of 5.4 μm or 2.2%.

TABLE 2

Measurement results of X and Z coordinates

| Position Case | Set (X, Z) Coordinate (μm) | Measured (X, Z) Coordinate (μm) | Error (%) |
|---|---|---|---|
| Scan 1-a | (−10,250) | (−8,252) | 1.1 |
| Scan 1-b | (10,250) | (15,252) | 2.2 |
| Scan 2-a | (−10,350) | (−10,346) | 1.1 |
| Scan 2-b | (10,350) | (12,347) | 1.0 |
| Scan 3-a | (−10,450) | (−13,453) | 0.9 |
| Scan 3-b | (10,450) | (10,447) | 0.7 |

In summary, a 2D displacement sensor with two parallel EFPIs bundled together with 130 μm spacing has been demonstrated to be successful in linear displacement measurement when two square wavelength-selective metasurface resonators (primary and secondary, each being 60 μm in X-direction) are spaced by 100 μm in center-to-center distance. The sensor is robust and has an accuracy of 5.4 μm or 2.2%. The interference pattern and the low attenuation band of an output reflection spectrum can be readily decoupled to determine the cavity length and the resonant wavelength (then X coordinate) of a metasurface resonator. The changes in cavity length and X coordinate from the primary and secondary resonators can determine the Z-component and X-component of a displacement.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

What is claimed is:

1. A three-dimensional position-to-optical displacement sensor, said sensor comprising
    an extrinsic Fabry-Perot interferometer (EFPI) in Z-direction;
    a plurality of plasmonic metasurface resonators with distinctive wavelength-selective characteristics in X and Y directions, wherein the interferometer comprises:
    an optic fiber for light propagation; and
    a mirror configured to create a light interference fringe as a function of the distance between the mirror and the distal end of the optic fiber,
    wherein each plasmonic metasurface resonator is configured to modify the mirror to measure horizontal displacements in the X and Y directions, wherein such plasmonic metasurface resonators comprise a pattern of multiple nanostructure unit cells that are distributed in a two-dimensional array in the X-Y plane.

2. The three-dimensional position-to-optical displacement sensor as set forth in claim 1 wherein said nanostructure unit cells are inscribed in a top layer of a three-layer thin film where the top layer is a gold layer and constitutes part of said mirror.

3. A three-dimensional rotation-to-optical displacement sensor, said sensor comprises:
    at least three extrinsic Fabry-Perot interferometers (EFPI) bundled together in Z direction;

a series of plasmonic metasurface resonators with distinctive wavelength-selective characteristics in X and Y directions, wherein the interferometer further comprises at least three single mode optic fibers, one for each of said EFPIs, for light propagation along respective parallel paths;

wherein each EFPI provides three position measurements, and wherein the linear displacement information from the three EFPIs is capable of being used to determine both translational and rotational displacements, and wherein the bundling of said three EFPIs is capable of providing monotonic displacement measurements.

4. The three-dimensional rotation-to-optical displacement sensor as set forth in claim 3 where each plasmonic metasurface resonator is fabricated by way of thin film deposition of Au—$SiO_2$—Au in three layers on a suitable substrate with an electron-beam evaporator, wherein the top Au layer constitutes part of a mirror.

5. The three-dimensional rotation-to-optical displacement sensor as set forth in claim 4 wherein said mirror has an m×n array of said metasurface resonators thereon.

6. The three-dimensional rotation-to-optical displacement sensor as set forth in claim 4 wherein the distal end of each of said optic fibers is positioned slightly apart from said mirror by a predetermined gap such that when light is propagated through the fibers, incident light is reflected at both the distal end of the fibers and the metasurface on said mirror.

7. The three-dimensional rotation-to-optical displacement sensor as set forth in claim 6 wherein said gap ranges between about 50 μm and about 500 μm.

8. The three-dimensional rotation-to-optical displacement sensor as set forth in claim 7 wherein said gap ranges between about 200 μm and about 400 μm.

9. The three-dimensional rotation-to-optical displacement sensor as set forth in claim 8 wherein said gap ranges between about 250 μm and about 350 μm.

10. A three-dimensional position-to-optical displacement sensor as set forth in claim 2 wherein said sensor uses a gold surface to increase the reflectivity and thus the Q-factor of EFPIs for accurate and reliable measurements, wherein said sensor operates in accord with the following method:

introducing said metasurfaces for wavelength-selective reflectivity;

integrating optical interference and reflection for enabling 3D displacement measurements to be determined, and packaging said sensor into a miniature device for embedment during material processing or structural formation in applications whereby said sensor can measure changes in displacement of said structural formation.

* * * * *